A. J. & I. F. FAUSEK.
TORCH.
APPLICATION FILED AUG. 12, 1914.
1,139,959.
Patented May 18, 1915.
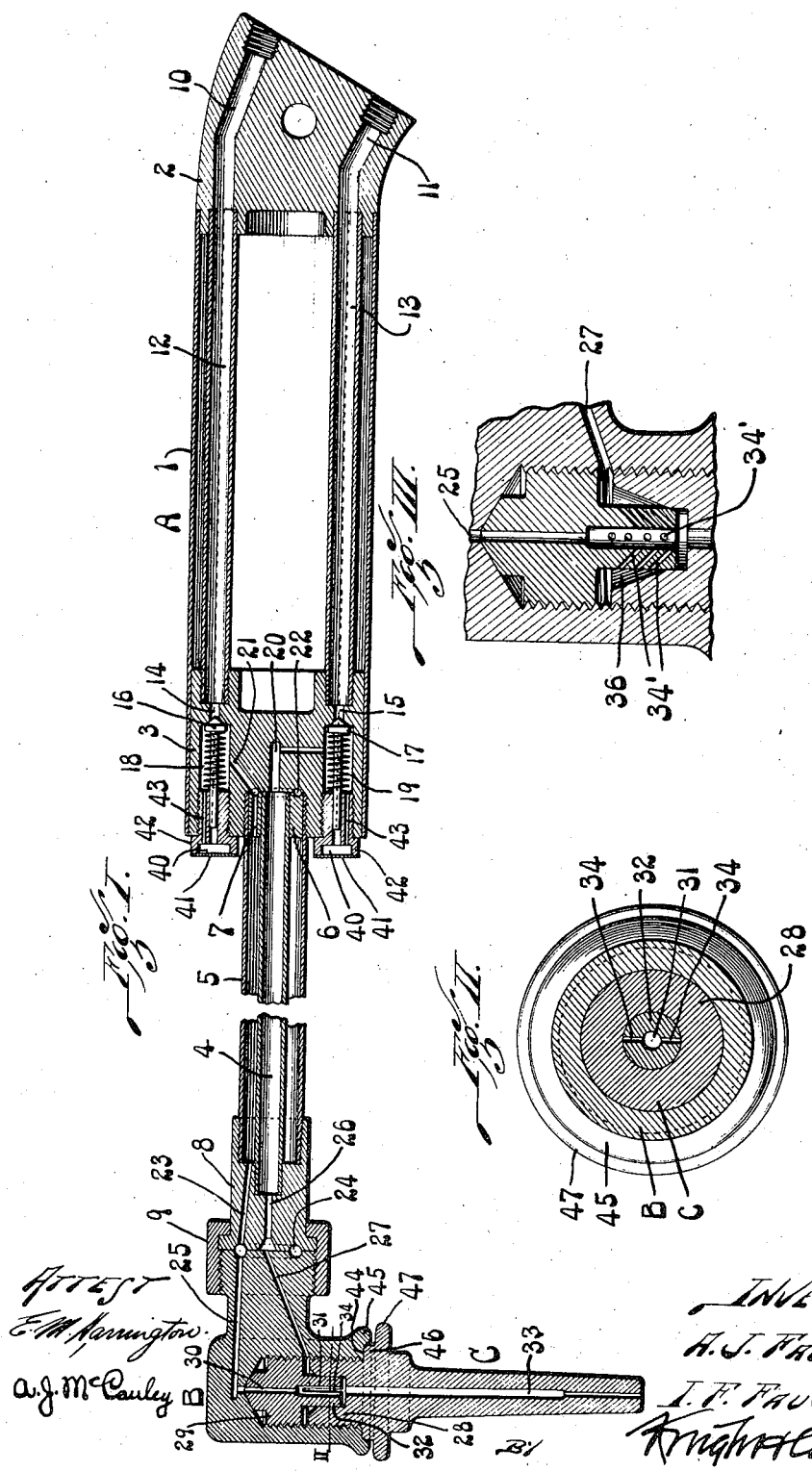

UNITED STATES PATENT OFFICE.

ARTHUR J. FAUSEK AND IRWING F. FAUSEK, OF ST. LOUIS, MISSOURI.

TORCH.

1,139,959.  Specification of Letters Patent.  Patented May 18, 1915.

Application filed August 12, 1914. Serial No. 856,326.

*To all whom it may concern:*

Be it known that we, ARTHUR J. FAUSEK and IRWING F. FAUSEK, citizens of the United States of America, residents of the city of St. Louis, State of Missouri, have invented certain new and useful Improvements in Torches, of which the following is a full, clear, and exact description, reference being had to the accompanying drawings, forming a part of this specification.

Our invention relates to a torch or blowpipe adapted to be used in welding operations, one of the objects being to produce a torch of this kind having a nozzle and passageways for conducting a mixture of acetylene gas and oxygen gas to said nozzle, the torch including a check valve for preventing the acetylene gas from being forced through the oxygen passageway. In a torch of the kind to which our invention relates the oxygen passageway is in communication with the acetylene passageway at a point adjacent to the nozzle where both gases are discharged, and under some conditions the pressure of the acetylene may be greater than the pressure of the oxygen. In this event the acetylene will tend to flow into the oxygen passageway, and if it is permitted to do so, the combustible mixture of acetylene and oxygen gas may be accidentally ignited and exploded in the oxygen passageway. We, therefore, place a check valve in the oxygen passageway so as to automatically close said passageway when the pressure of the acetylene is greater than the pressure of the oxygen.

The preferred form of our invention comprises a discharge head and a nozzle screwed into the discharge head, the latter being provided with a smooth seat adapted to receive the nozzle. To prevent leakage of the acetylene gas at the joint between the nozzle and the discharge head, the seat just referred to must be kept perfectly smooth, and one of the objects of our invention is to provide means for protecting such seats to prevent them from being accidentally scratched or otherwise marred or mutilated.

The invention also includes other details of construction which will be hereinafter described and set forth in the claims.

Figure I is a longitudinal section of a torch or blow pipe embodying the features of our invention. Fig. II is an enlarged transverse section taken on line II, Fig. I. Fig. III is an enlarged detail view illustrating a modification.

A designates a handle connected to a discharge head B, and C designates a nozzle secured to said discharge head. The handle comprises a tubular member 1, an inlet member 2 at one end of said tubular member 1, and a valve housing 3 at the other end of the member 1.

4 designates an acetylene tube surrounded by an oxygen tube 5, said tubes being connected to each other by means of an annular distance piece 6 having a passageway 7 which communicates with the oxygen tube 5. A flanged coupling head 8 secured to the tubes 4 and 5, is coupled to the discharge head B, preferably by means of a union coupling 9, the latter being screwed onto the discharge head. One end of the oxygen tube 5 is screwed into the valve housing 3 so that both of the tubes 4 and 5 may be readily removed by unscrewing the tube 5 from the valve housing 3 and removing the union coupling 9 from the discharge head B.

The inlet member 2 at one end of the handle is provided with an oxygen passageway 10 and an acetylene passageway 11, and when the torch is in service these passageways are in communication with the oxygen and acetylene tanks.

12 and 13, respectively, designate tubes arranged within the handle A and leading from the passageways 10 and 11 to the valve housing 3, the latter being provided with ports 14 and 15 which communicate with said tubes. Check valves 16 and 17 arranged in valve chambers 18 and 19 are adapted to open and close the ports 14 and 15. An angular passageway 20 leads from the acetylene tube 4 to the valve chamber 19, and a passageway 21 leads from the valve chamber 18 to an annular passageway 22 formed at the end of the distance piece 6, said annular passageway being in communication with the passageway 7 leading to the tube 5. The oxygen forced into the inlet passageway 10, at the right hand end of Fig. I passes through the tube 12, into the port 14, through the valve chamber 18, then through the passageway 21, into the annular passageway 22, through passageway 7, into oxygen tube 5, through a passageway 23, and into an annular passageway 24 formed between the connecting head 8 and discharge head B. The discharge head B is provided with an oxygen passageway 25 communicating with the annular passageway 24. The acetylene gas primarily forced into the passageway 11 flows through the tube 13, and port 15, into the valve chamber 19, through the angular passageway 20 and tube 4 to a passageway 26 in the coupling member 8, and then into a passageway 27 formed in the discharge head B. The discharge head B is provided with a screw threaded opening, and the nozzle is provided with a screw threaded neck 28 screwed into said opening. A threaded member 29, also screwed into the discharge head, is provided with a longitudinal passageway 30 enlarged at its lower end to form a mixing chamber 31, the latter being formed in a tubular neck 32. The oxygen from the passageway 25 flows through the passageway 30 into the mixing chamber 31 and is discharged through the passageway 33 in the nozzle C. The tubular neck 32 is provided with transverse passageways 34 through which the acetylene is forced from the passageway 27. The acetylene mixing with the oxygen in the mixing chamber 31 is discharged with the oxygen through the nozzle C.

Owing to the difficulty in regulating the flow of acetylene gas and the danger incident to improper regulation, we provide means for automatically regulating the flow of acetylene in accordance with the dimensions of the discharge port in the nozzle C. Nozzles of different dimensions may be screwed into the discharge head, and to secure the desired regulation the tubular neck 32 is surrounded by and closely fitted to the inner end portion of the nozzle, the transverse passageways 34 formed in said neck being partially closed by the inner end of the nozzle. These passageways 34 are preferably formed by slotting the tubular neck 32 as shown in Figs. I and II, but if desired, the neck may be provided with perforations 34' as shown in Fig. III. The object in forming the elongated passageways or the series of passageways in the tubular neck 32 is, as previously suggested, to provide means for regulating the flow of acetylene gas in accordance with the size of the passageway in the discharge nozzle, and the different nozzles are therefore constructed to slide along the outer face of said tubular neck to partially close the transverse passageways 34. A large nozzle or a nozzle having a very large discharge passageway 33 may be provided with a tapered opening 36 as shown in Fig. III, so that the transverse passageways 34 or 34' will not be closed by the nozzle and a nozzle having a smaller discharge port 33 may be constructed as shown in Fig. I, so as to expose only the upper ends of the transverse passageways 34. Any desired regulation may be obtained by varying the length of the threaded necks 28 on the nozzles, or by enlarging the hole at the inner ends of said threaded necks as shown in Figs. I and III.

The check valves 16 and 17 are located in the strong valve chamber 3 at a point adjacent to the conductors leading to the nozzle, and owing to their location, these check valves will protect the handle from the effects of an explosion occurring between the handle and the nozzle.

The pressure of the acetylene gas is, under some unusual conditions, greater than the pressure of the oxygen gas, and the acetylene will then tend to flow from the mixing chamber 31 into the oxygen passageways. Our torch is so constructed that the check valve 16 will close automatically to prevent the acetylene from flowing backwardly through the oxygen passageways.

The invention also includes a safety device for preventing injury to any of the gas conductors when the gas contained therein is accidentally exploded. With this object in view the gas conductors are provided with exhaust ports 40 normally closed by yieldable sheet metal closures 41 adapted to be opened or ruptured by the force of an explosion in the gas passageways. Each closure 41 is soldered, or otherwise suitably secured to a plug 42 screwed into the valve housing 3 and serving as a guide for one of the check valves, each of said plugs 42 being provided with a passageway 43 leading from a valve chamber to an exhaust port 40.

It will be noted that each of the safety devices is in communication with a gas passageway at a point between a check valve and the discharge nozzle, the object being to so locate these parts that the main gas supply cannot be ignited or otherwise affected by an explosion occurring in the passageway which communicates with the safety device. If the check valve was not located between the safety device and the main gas supply, the exploding gas, ignited at the nozzle, would be free to flow backwardly into main gas supply. However, owing to the location of the check valve, the force of the explosion cannot be relieved by the flow of burning gas to the gas supply; and since the expanding gas is confined in the passageway leading from the check valve to the nozzle, the safety device communicating with said passageway will yield to prevent injury to other parts of the torch structure.

A smooth annular nozzle seat 44 is formed in the discharge head at the outer end of the screw threaded opening in said head, and this smooth nozzle seat is surrounded by an annular rib 45 projecting from the outer end of the discharge head. When the nozzle is removed from the discharge head, the annular rib 45 serves as a shield for preventing the smooth nozzle seat from being accidentally scratched or otherwise mutilated. The nozzle is provided with an abutment shoulder 46 extending from its screw threaded neck and provided with a smooth annular face which firmly engages the smooth seat on the discharge head so as to prevent leakage of the acetylene gas at this point. The nozzle is also provided with an annular rib 47 located adjacent to the abutment shoulder 46 and serving as a shield for the smooth annular face of said abutment shoulder. The annular rib 47 and the threaded neck 28 of the nozzle are so located that the smooth abutment face on the nozzle is not liable to be accidentally marred when the nozzle is removed from the torch.

We claim:—

1. A torch having a handle, a nozzle, conductors leading from said handle to said nozzle, the handle being provided with passageways through which oxygen gas and acetylene gas may be forced to said conductors, and check valves arranged in said handle at points adjacent to said conductors to prevent gas from being forced backwardly into the handle.

2. A torch having a nozzle, a gas conductor leading to said nozzle, said gas conductor being provided with an exhaust port, and a sheet metal closure for said exhaust port, adapted to be ruptured when the gas is exploded in said conductor.

3. A device of the character described comprising fluid conductors, one of which is provided with a screw threaded opening, a smooth annular seat at the outer end of said opening and a protective rib surrounding said smooth annular seat; the other fluid conductor being provided with a screw threaded neck adapted to fit into said screw threaded opening and an abutment adjacent to said screw threaded neck, said abutment being provided with a smooth face adapted to engage said annular seat.

4. A device of the character described comprising fluid conductors, one of which is provided with a screw threaded opening, a smooth annular seat at the outer end of said opening and a protective rib surrounding said smooth annular seat; the other fluid conductor being provided with a screw threaded neck adapted to fit into said screw threaded opening, an extended abutment, adjacent to said screw threaded neck, said abutment being provided with a smooth face adapted to engage said annular seat, and a protective rib extending from said abutment.

5. A torch nozzle having a screw threaded neck at its inner end, an abutment shoulder extending from said screw threaded neck, said abutment shoulder being provided with a smooth face for the purpose described, and a protective rib for shielding the smooth face of said abutment shoulder.

6. A torch having a discharge head provided with a tubular neck, and a nozzle secured to said discharge head and surrounding said tubular neck, said nozzle being slidably fitted to the outer face of said tubular neck, said tubular neck being provided with a longitudinal passageway communicating with said nozzle and with a transverse passageway leading to said longitudinal passageway, and the said nozzle being movable along the outer face of said tubular neck so as to partially close said transverse passageway for the purpose described.

7. A torch having a discharge head provided with an internal neck, and a nozzle extending into said discharge head and surrounding said internal neck, said nozzle being slidably fitted to the outer face of said tubular neck, said internal neck being provided with a longitudinal oxygen passageway communicating with said nozzle and with a transverse acetylene passageway leading to said longitudinal passageway, and the inner end portion of said nozzle being movable along the outer face of said internal neck so as to partially close said transverse acetylene passageway for the purpose described.

8. A torch having a discharge head provided with a tubular neck, and a nozzle extending into said discharge head and closely fitted to said tubular neck, said tubular neck being provided with a longitudinal oxygen passageway communicating with said nozzle and with a transverse acetylene passageway leading to said longitudinal passageway, and the inner end portion of said nozzle being adapted to slide along said tubular neck so as to partially close said transverse acetylene passageway for the purpose described.

9. A torch having a nozzle, a gas conductor leading to said nozzle, said gas conductor being provided with an exhaust port, and a closure for said exhaust port adapted to be ruptured when the gas is exploded in said gas conductor.

10. A torch having a nozzle, a gas conducting device provided with a passageway leading to said nozzle, a check valve in said passageway, and a safety device adapted to yield when gas is exploded in said passageway, said safety device being in communication with said passageway at a point between said check valve and nozzle.

ARTHUR J. FAUSEK.
IRWING F. FAUSEK.

In the presence of—
A. J. McCAULEY,
E. CLARK.